United States Patent
Zeigler et al.

(10) Patent No.: US 11,789,517 B1
(45) Date of Patent: Oct. 17, 2023

(54) SYSTEM AND METHOD FOR CLOCK-FREQUENCY-BASED DESIGN PROCESS FRAMEWORK FOR DISCRETE EVENT SYSTEMS CHIP

(71) Applicant: RTSync Corp., Chandler, AZ (US)

(72) Inventors: Bernard Zeigler, Chandler, AZ (US); Doohwan Kim, Chandler, AZ (US)

(73) Assignee: RTSync Corp., Chandler, AZ (US)

( * ) Notice: Subject to any disclaimer, the term of this patent is extended or adjusted under 35 U.S.C. 154(b) by 0 days.

(21) Appl. No.: 18/305,661

(22) Filed: Apr. 24, 2023

(51) Int. Cl.
  *G06F 1/32* (2019.01)
  *G06F 1/324* (2019.01)
  *G06F 1/08* (2006.01)

(52) U.S. Cl.
  CPC ............... *G06F 1/324* (2013.01); *G06F 1/08* (2013.01)

(58) Field of Classification Search
  CPC .................................. G06F 1/324; G06F 1/08
  See application file for complete search history.

(56) References Cited

U.S. PATENT DOCUMENTS

| | | | |
|---|---|---|---|
| 7,363,097 B2 | 4/2008 | Sakai | |
| 7,369,977 B1 | 5/2008 | Clune et al. | |
| 7,483,913 B2 | 1/2009 | Hekmatpour | |
| 7,487,077 B1 | 2/2009 | Clune et al. | |
| 7,640,154 B1 | 12/2009 | Clune et al. | |
| 7,877,248 B1 | 1/2011 | Clune | |
| 7,913,222 B2 | 3/2011 | Ogilvie et al. | |
| 7,925,477 B2 | 4/2011 | Clune | |
| 7,966,161 B1 | 6/2011 | Clune et al. | |
| 8,135,976 B2 * | 3/2012 | Brown | H03K 19/0016 713/500 |
| 8,239,700 B2 * | 8/2012 | Nation | G06F 1/206 714/22 |
| 2002/0087696 A1 * | 7/2002 | Byrnes | H04L 43/12 709/226 |
| 2002/0133325 A1 | 9/2002 | Hoare et al. | |
| 2006/0155525 A1 | 7/2006 | Aguilar et al. | |

(Continued)

OTHER PUBLICATIONS

H. G. Molter, A. Seffrin and S. A. Huss, "DEVS2VHDL: Automatic transformation of XML-specified DEVS Model of Computation into synthesizable VHDL code," 2009 Forum on Specification & Design Languages (FDL), Sophia Antipolis, France, 2009, pp. 1-6.

(Continued)

*Primary Examiner* — Zahid Choudhury
(74) *Attorney, Agent, or Firm* — Dilworth & Barrese, LLP.

(57) ABSTRACT

Embodiments disclose a DEVS chip is used to send only meaningful data in the system and therefore saves energy and increase processing speed. The sensor nodes communicate with an office chip temperature sensor or power management. The data acquired by the senor nodes is used for evaluating of the quantizer which has a stored quantum size and a stored temperature value or power level. If the difference between a stored temperature or a stored power level and a new temperature or a new stored power level is greater or equal to the predetermined quantum size, the new temperature or new power level is saved. The quantizer generates an event that transmits the temperature or the power level with quantum value to the sensor nodes. The small changes in the difference does not effect the system beyond the quantizer.

14 Claims, 17 Drawing Sheets

(56) References Cited

U.S. PATENT DOCUMENTS

2008/0098349 A1    4/2008  Lin et al.
2021/0200462 A1*   7/2021  Jain .......................... G11C 8/12

OTHER PUBLICATIONS

S. Mehta and G. A. Wainer, "DEVS for mixed-signal Modeling based on VHDL," Jan. 2005.

Young Moo Lee, Heung Bum Kim, Joon Sung Hong and Kyu Ho Park, "Translation from DEVS models to synthesizable VHDL programs," Proceedings of Digital Processing Applications (TENCON '96), Perth, WA, Australia, 1996, pp. 252-255 vol. 1, doi: 10.1109/TENCON.1996.608809.

L. Capocchi, F. Bernardi, D. Federici and P. Bisgambiglia, "Transformation of VHDL descriptions into DEVS models for fault modeling," SMC'03 Conference Proceedings. 2003 IEEE International Conference on Systems, Man and Cybernetics. Conference Theme—System Security and Assurance (Cat. No. 03CH37483), Washington, DC, USA, 2003, pp. 1205-1210 vol. 2, doi: 10.1109/ICSMC.2003.1244575.

Tag-Gon, Kim, et al., "DHMIF: DEVS-Based Hardware Model Interchange Format," Oct. 2001, Kaist.

* cited by examiner

```
<outports>
    <outport>
        <Name>Even</Name>
        <Type>Int</Type>
    </outport>
    <outport>
    ...
    </outport>
</outports>
```

FIG. 5A

```
entity Example is
port(
    Clk                  : In std_logic;
    Reset                : In std_logic;
    Start_Event          : In std_logic;
    Even_Port            : Out std_logic_vector(0 to 31);
    Even_Event           : Out std_logic;
    Odd_Port             : Out std_logic_vector(0 to 31);
    Odd_Event            : Out std_logic;
    Time_Advance         : Out std_logic_vector(0 to 31);
    Elapsed_Time         : In std_logic_vector(0 to 31);
    Time_Advance_Set     : Out std_logic;
    Clk_Dis              : Out std_logic;
    Time_Event           : In std_logic
);
end Example;
```

FIG. 5B

```
<StateVariables>
    <StateVariable>
        <Name>Stored_Time</Name>
        <Default>0</Default>
    </StateVariable>
</StateVariables>
<states>
    <state>wait</state>
    <state>Timer</state>
    <InitialState>wait</InitialState>
</states>
```

FIG. 6A

```
--Entity
architecture Behavioral of Example is
type STATE_TYPE is (wait_State, Timer_State);
signal State_Sig       : STATE_TYPE;
begin
    SensorNode_PROC : process(Clk) is
    variable DeltaFlag : std_logic;
    variable Stored_Time_var : std_logic_vector(0 to 31);
    begin
        --state machine
```

FIG. 6B

```
<deltext>
<ExternalTransitiontext TransitionID="1">
<IncomingMessage>Start</IncomingMessage>
<transition>
<evaluate>Sigma = Stored_Time</evaluate>
<StartState>wait</StartState>
<DefaultState>Timer</DefaultState>
</transition>
</ExternalTransition>
</deltext>
```

FIG. 7A

```
if (Start_Event = '1') then
    sigma_Var := Stored_Time_Var ;
    State_Sig <= Timer_State;
    if (sigma_Var = conv_std_logic_vector(0,32) ) then
        Time_Advance <= sigma_Var;
        Time_Advance_Set <= '1';
        Clk_Dis <= '1';
        DeltaFlag := '0';
    else
        Clk_Dis <= '0';
        Time_Advance_Set <= '0';
        DeltaFlag := '1';
    end if;
else
```

FIG. 7B

```
<LamdaSet>
 <lamda>
  <state>Timer</state>
  <OutputPort>
   <outputConditional>
    <condition>Stored_Time AND 1 = 0</condition>
    <Variable>Stored_Time</Variable>
   </outputConditional>
   <Port>Odd</Port>
  </OutputPort>
  <OutputPort>
  ...
  </OutputPort>
 </lamda>
</LamdaSet>
<deltint>
 <InternalTransition intTransitionID="1">
  <transition>
  ...
  </transition>
  <InternalTransition>
 <InternalTransition intTransitionID="2">
 ...
 </InternalTransition>
</deltint>
```

FIG. 8A

```
if(Time_Event = '1') OR DeltaFlag = '1') then
 Stored_Time_Var:= Elapsed_Time + conv_std_logic_vector(1,32);
 State_Sig <=wait_State;
 Clk_Dis <= '1';
 Time_Advance_Set <= '0';
 DeltaFlag := '0';
 if(Stored_Time_Var and conv_std_logic_vector(1,32)= conv_std_logic_vector(0,32)) then
  Odd_Port <=Stored_Time_Var;
  Odd_Event <='1';
 else
  Odd_Event <='0';
 end if;
 if(Stored_Time_Var and conv_std_logic_vector(1,32)= conv_std_logic_vector(1,32)) then
  Even_Port <=Stored_Time_Var;
  Even_Event <='1';
 else
  Even_Event <='0';
 end if;
else
```

FIG. 8B

```
<TimeAdvance>
  <ta>
    <state>wait</state>
    <Timeout>-1</Timeout>
  </ta>
  <ta>
    <state>Timer</state>
    <Timeout>0</Timeout>
  </ta>
</TimeAdvance>
```

FIG. 9A

```
if (Reset = '1') then
  Stored_Time_var:= conv_std_logic_vector(0, 32);
  Clk_Dis <= '0';
  State_Sig <= wait_State;
  Time_Advance <= conv_std_logic_vector(-1,32);
  Time_Advance_Set <= '0';
  DeltaFlag := '0';
  Even_Port <= (others=>'0');
  Odd_Port <= (others=>'0');
```

FIG. 9B

SYSTEM AND METHOD FOR CLOCK-FREQUENCY-BASED DESIGN PROCESS FRAMEWORK FOR DISCRETE EVENT SYSTEMS CHIP

FIELD OF THE INVENTION

The present disclosure relates generally to model-based, real-time, discrete event systems and methodology for reducing power consumption and improving efficiency of such systems.

BACKGROUND

Modern Information Technology (IT) often calls for computer systems that combine sensing, communication, computation and actuation. Currently, such systems rely on technologies that are optimized for as fast as possible computation, which are made to run more efficiently using techniques such as voltage and frequency scaling. However, such designs do not exploit the salient properties of the next generation of IT systems. Such model-based, real-time, discrete event systems will to create systems that use massive amounts of streaming data in the form of event about their environments and their own histories to dictate the systems' continuing behavior. Such streaming data will be encapsulated into internal models to support anticipatory decision making, allowing the system to stay ahead, in real time, of its environmental challenges. Current hardware designs do not exploit such a system's ability to predict the computational requirements of its components based on its internal models. Therefore the hardware runs as fast as the needed by the most demanding component, rather than employing a much more energy efficient distribution of clock frequencies matched to the intrinsic rates of its components. For example, systems with non-renewable energy sources (e.g., sensors dropped in a forest) should be able to adapt their computations and associated clock frequencies as the power status is updated in real-time.

<Model-based, real-time> systems are complex systems that tightly integrate sensing, communication, computation, and actuation—and therefore are influenced—by the natural or physical world. Engineering of <Model-based, real-time> systems requires careful consideration of numerous design metrics including time constraints, reliability, security, stability, and energy consumption, among many others. As the complexity and prevalence of energy-constrained <Model-based, real-time> systems continues to grow, achieving stringent real-time sensing, computation, and communication constraints while minimizing power consumption is a critical challenge. At the same time, engineers must deal with the time varying nature of application requirements—both sensing and computation—or <Model-based, real-time> systems that have several modes of operation. These multimodal behaviors often depend on external environmental factors influencing system behavior that are not known a priori. For natural systems, optimizing such systems presents added challenges in that the efficacy of specific optimization methods may not be suitable for particular physical stimuli or application modes. This further compounds the challenges in optimizing <Model-based, real-time> systems.

Existing approaches to designing and engineering <Model-based, real-time> systems frequently assume worst-case execution requirements in which the sensing and computation is performed as fast as possible subject to timing constraints. This often results in ad hoc methods for optimization so that systems may be over engineered for the applications' requirements. For energy-constrained systems, existing low-power design methodologies focus mainly on individual sub-systems or utilize ad-hoc methods that do not specifically address the influence of the physical world on the computational processes. For example, significant research has investigated low-power processing techniques that employ voltage and frequency scaling, compiler optimizations, reconfigurable computing, network communication protocols, etc. For large data centers, power management strategies can focus on workload balancing, process frequency scaling, management of physical components such as hard disk, etc., but these changes do not affect the computational behavior of those applications.

BRIEF SUMMARY OF THE INVENTION

The <Model-based, real-time> systems encapsulate internal models that allow tuning their execution behaviors to their intrinsic computational requirements at the hardware level where the greatest savings in energy can be achieved.

Thus, a need exists for a holistic approach that tightly integrates sensing, computation, timing, and power requirements, specifically with the goal of enabling engineers to define optimization goals that are informed by and aware of the interaction between the physical world, computational processes, and <Model-based, real-time> system as a whole. The history of the system to characterize the system's current state using DEVS hierarchical, modular, model construction methodology can be used for elimination of unnecessary computations so that the hardware is able to perform as fast as needed with significantly reduced power consumption.

BRIEF DESCRIPTION OF THE DRAWINGS

FIGS. 5A and 5B are a set of program listings on a display showing a port declaration in DC_XML and a closest parallel in VHDL;

FIGS. 6A and 6B are a set of program listings on a display showing a representation of the states and state variables in DC-XML and VHDL;

FIGS. 7A and 7B are a set of program listings on a display showing an external transition, $\delta_{ext}$, in DC-XML and VHDL;

FIGS. 8A and 8B are a set of program listings on a display showing an internal transition, $\delta_{int}$, in DC-XML and VHDL;

FIGS. 9A and 9B are a set of program listings on a display showing that individual timeouts are output to the time advance timer at the entry to the state;

Like reference numerals indicate similar parts throughout the figures

DETAILED DESCRIPTION OF THE INVENTION

Figure 1A:
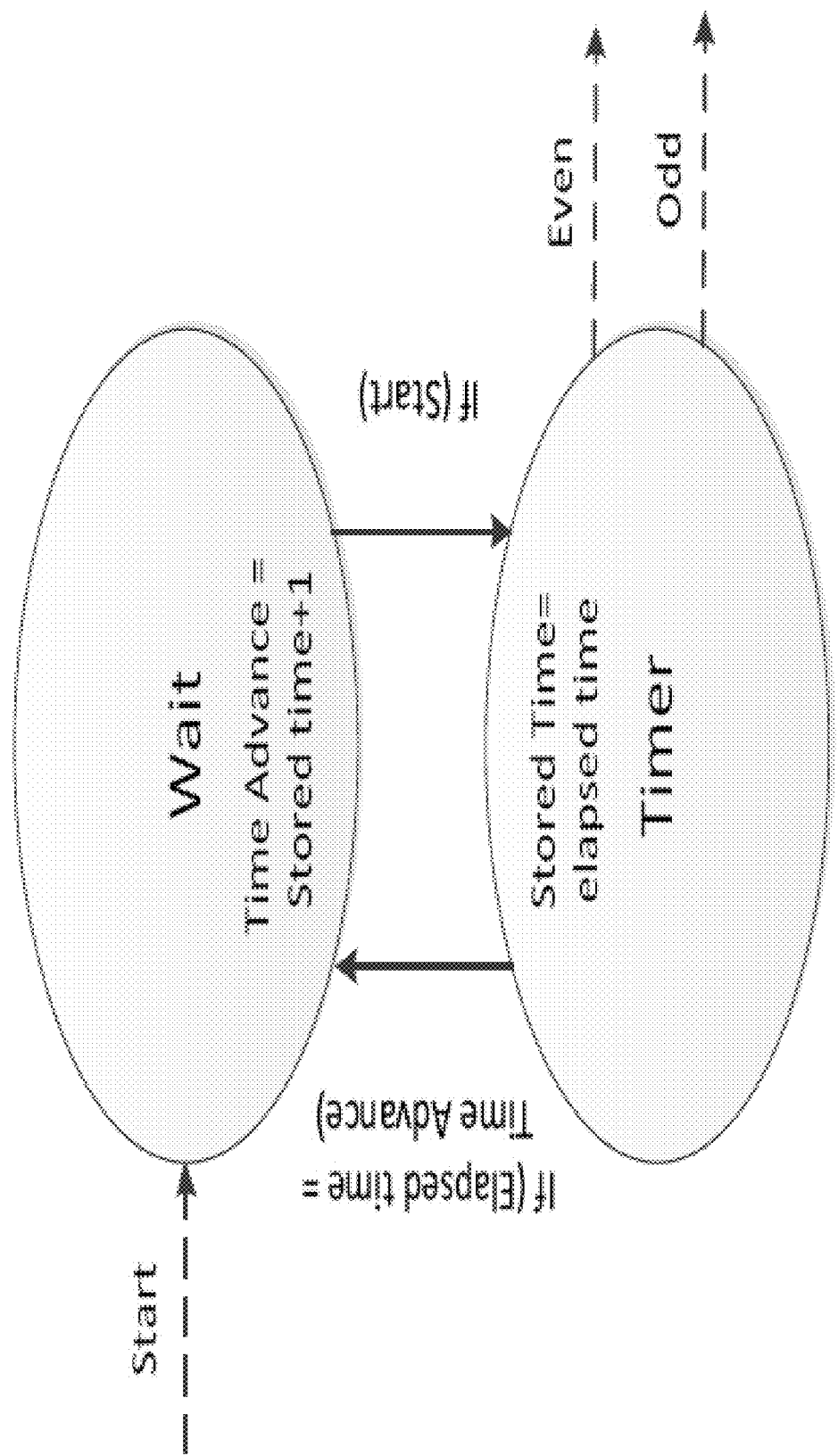
FIG. 1A illustrates an example DEVS model with ports for receiving and generating.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

As shown in FIGS. 1-16, implementations of a design flow that allows one to use a Discrete EVent Systems (DEVS) specification of events and behavior for a system and generate power efficient hardware matched to a systems' computational demands.

The DEVS formalism is a set theory based on the set theory proposed by B. P. Zeigler (inventor) in 1976. The DEVS formalism provides a mathematical basis for modeling the discrete event system by module and hierarchical connection. The atomic model representing the system components and the coupled model that can construct a new model by combining several models can be used to represent the system hierarchically and modularly using these two types of models. This object-oriented modeling can increase the reusability, maintainability, and reliability of the model.

Discrete-event system specification (DEVS) is a modeling formalism that can be used to define a system's behavior and structure. DEVS provides a modular and hierarchical formalism for modeling and analyzing event-based systems and uses state-based specifications that can easily be translated into hardware designs. A timed sequence of events can cause changes to the system's state—these events may be external events (e.g., generated by another model) or internal events (e.g., generated by the model itself due to a time event). The system's next states are defined based on the previous state and the event, and the state does not change between events.

In the DEVS formalism, a model can be atomic to capture the system component behavior or building blocks of a model. Alternatively, a model can be coupled, involving the combination of and communication between different atomic models, to capture the system structure. In its classic form, the DEVS atomic model can be defined as a 7-tuple with the structure:

$$M = <S, X, Y, \delta int, \delta ext, \lambda, ta>$$

where S is the set of states, X is the set of inputs, Y is the set of outputs, $\delta int$ is the internal transition function that changes the state after an internal event has occurred, $\delta ext$ is the external transition function that changes the state based on the arrival of an external event, $\lambda: S \rightarrow Y$ is the output function, and to is the time advance function. A system is initially in a start state, and each state has a time advance that dictates the amount of time spent in the state before an internal transition is triggered. Apart from positive real-valued time advance, the time advance may also be zero, offering a convenient construct for transitory states. Finally, an infinite time advance represents passive (inactive) states. An internal transition may trigger an output function whose outputs may cause external transitions on other models' input ports.

This highly innovative design approach may be utilized to create <Model-based, real-time> systems that develop and exploit information about their environments and their own histories to anticipate, and stay ahead of, their environment's next challenges. As a modeling formalism marrying mathematical systems theory and efficient event-based simulation, DEVS offers an ideal vehicle to express predictive models abstracting massive event-streams for real-time anticipatory decision-support. The presence of such models, and their decomposition into components, allows explicit characterization of the components' computational requirements. A critical advantage of this DEVS-based design flow approach lies in the fact that the hardware is designed to exploit such an explicit characterization of the computational frequency demands of its DEVS components. Therefore, the hardware employs a distribution of clock frequencies matched to the intrinsic rates of its components and the hardware can perform as fast as needed with significantly reduced power consumption due to elimination of unnecessary computations.

Implementations of the system and methods disclosed herein may use the history of the system to characterize the system's current state using DEVS hierarchical, modular, model construction methodology. Accordingly, the system may be broken up into a series of processes or activities that monitor what has been accomplished. This can be applied to any level of abstraction, from the smallest computation to whole functions. One use of these activities is to assign a cost to each action performed, in terms of energy, and use those costs to keep track of energy consumption. This concept can be easily mapped to DEVS events. At the most basic level, each event can correspond to some activity, or at a higher level, a few specific events can be used to characterize the flow of the system.

Additionally, one can use the concept of activity to characterize a sensor signal. The signal can be broken down into information quanta, which is the minimum amount of change in the signal that is meaningful. Accordingly, only meaningful changes in the signal are processed, which reduces power consumption and improves efficiency.

By non-limiting example, and for illustrative purposes only, these concepts may be illustrated in the context of monitoring the progress of a wildfire. Wildfires pose a serious threat to communities and ecosystems and are increasingly expensive disasters in terms of property damage and death toll. One of the major problems in understanding and combating wildfires is to detect and monitor the time history of the fire. Early detection of wildfires leads to timely response and can significantly reduce the fire suppression cost before a fire becomes too large to be controlled. Understanding the size, location, and rate of spread of the fire front is critical to optimal allocation of firefighting resources and to maintaining the safety of the fire crew. Investigation of major wildfire accidents involving loss of life often shows that the crews became imperiled because of insufficient or untimely information about the location and speed of advance of the fire. One way to monitor wildfires is by using wireless, low-power sensor technology to collect environmental data such as temperature, relative humidity and barometric pressure, along with a GPS-determined location for the collected data.

Sensor-based wildfire monitoring is characterized by long monitoring times because the time at which a fire occurs is unknown beforehand. Furthermore, reliable and time sensitive data collection is imperative in order to provide accurate and real-time information about fire propagation. The design of fire sensors is crucial such that stringent real-time sensing and computation constraints are met while minimizing power consumption. Furthermore, wildfire monitoring is also characterized by having complex sensor data profiles due to the different terrain, vegetation, and weather conditions of the different sensors. For example, two sensors may have different profiles of temperature data, including different temperature values, different starting time and active periods, and different shapes of temperature change. Due to these different data profiles, a predefined worst-case optimization strategy will not work effectively for all sensors. Instead, an activity-driven strategy where sensing and computation are performed based on the current system activity and physical conditions is necessary.

For such a system, sensing, processing, and communication can be defined and adapted based upon the current activity of the system in order to conserve energy consumption and extend system lifetime. In the absence of a wildfire, sensing current conditions and location is only necessary to the point of detecting the initial outbreak of a wildfire. Once a fire is detected, faster sensing of environmental conditions is necessary to provide the required information needed to monitor the wildfire as is spreads. Just as important though, is the need to continually monitor the wildfire progress even as it passes a particular location, as the historical data will help to improve the understanding of wildfire behavior. In designing such a system, two key energy metrics emerge. First, ensuring the power consumption of individual nodes is minimized to the greatest extent possible at design time is needed to provide a low-power physical implementation. Secondly, the system itself must be aware of its physical environment and surrounding sensor nodes such that nodes can adapt their sensing, processing, and communication at runtime to ensure the nodes can collect vital information throughout the wildfire. In other words, rather than operating until the available energy is exhausted, sensing nodes should adapt their activities given the available energy and predicted duration of the wildfire event.

Thus, in the context of the wildfire example, a sensor may be designed using a microcontroller which broadcasts temperature wirelessly for use in monitoring wildfires. Each time a temperature change of the size of the information quantum occurs, a wireless transmission is made, and the energy consumption of the transmission is estimated. The sensor controls its behavior by changing the quantum size based on the estimated remaining power and the temperature. The sensor's goal is to describe the progress of the fire including changes in the intensity of the fire. As the temperature increases, the quantum is reduced to obtain a finer and more detailed description of the fire. The second factor that is considered which may trigger a change in the quantum size is an estimate of the remaining internal power of the system. Because the sensor has a finite number of transmissions, and it is important to keep track of the entire fire, as the estimated power levels decrease, the quantum size is increased to reduce the number of transmissions needed to track the entire fire. In another embodiment, the wildfire can apply for each component of the enlarged systems. Each component of the enlarged system can produce activities or processes which can be tracked and monitored with DEVS chips for transmission information.

Implementations of the DEVS-based design flow approach (the DEVSChip for short) as disclosed herein are enabled by an innovative conjunction of formal methods for characterizing system activities, information quantization, sensing requirements, and timing constraints. The relationship between physical dynamics of the system and computational processes dictates the design of the sensing, computation, communication, and actuation processes. The objective is that these processes can be dynamically adjusted to perform only as fast as needed for the current activity in the current physical environment. This provides significant advantages in designing low-cost, low-power systems that meet application requirements while supporting a formalism that allows specifying and verifying time requirements for individual activities. Furthermore, by characterizing system requirements for each activity, the processing and computational requirements can be effectively adapted and optimized at runtime to meet the changing system needs.

An atomic model in the DEVS formalism is a specification that comprises the following seven parts: input events (X), output events (Y), states(S), a time advance function (ta), an external transition function ($\delta_{Ext}$), an internal transition function ($\delta_{Int}$), and an output function ($\lambda$).

An example DEVS model is shown in FIG. 1A. In some implementations, events are received and generated through ports which may have a port name and associated value. As shown in the example of FIG. 1A, there is one input event (Start) and two output events (Even and Odd). All of these events can have a real value associated with them, but only Even and Odd will utilize the real values. As one of benefits in the implementations, in DEVS an event occurs in zero time and has no memory. For an integer event the value is transferred instantly. Note that the time advance concept allows DEVS models to also represent delays.

Figure 1B:
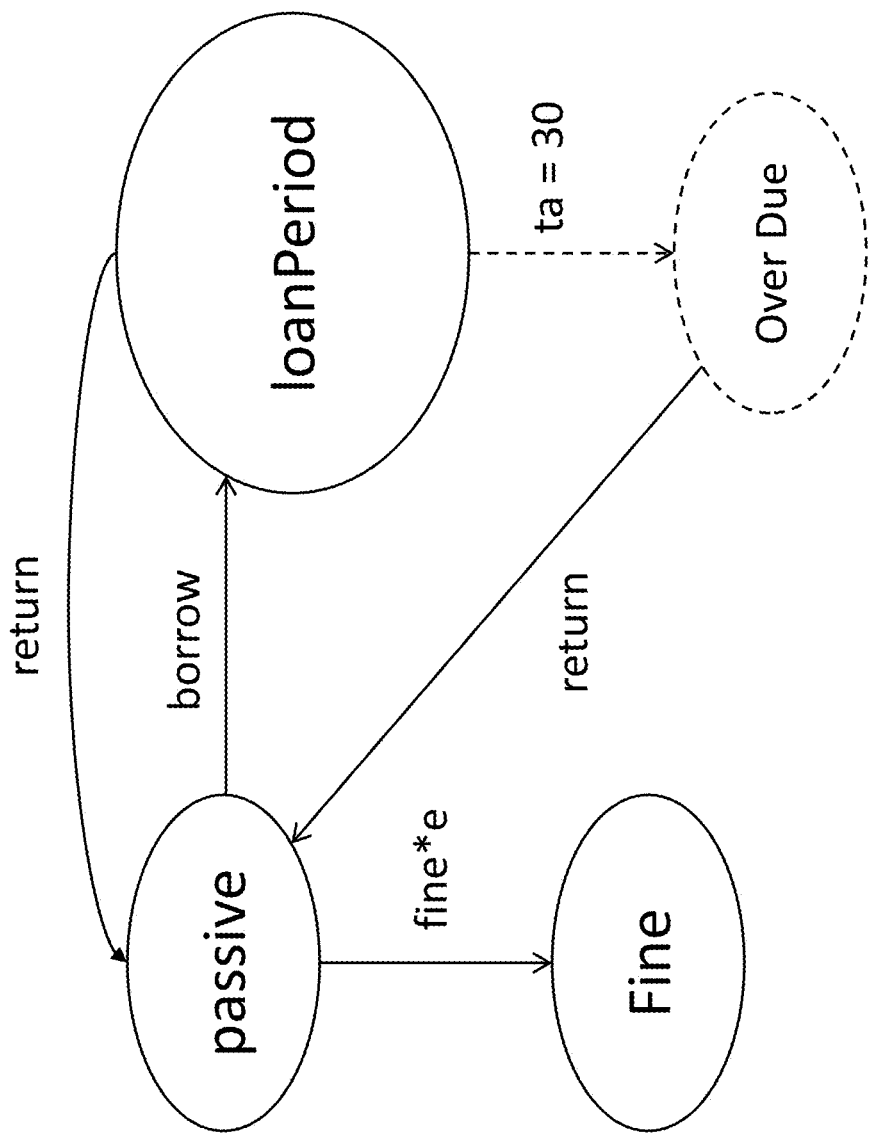
FIG. 1B illustrates an DEVS model with a borrowing/return process for a library book.

As another example, a DEVS model with the borrowing/return process for a library book is illustrated in FIG. 1B. Note that external transitions are shown with solid arrows; internal transitions are shown with dashed arrows. The model has 3 states: passive, loanPeriod, and fine. The time advances of passive and fine are infinity. The time advance of loanPeriod is 30 days. There are two input ports, borrow and return, and one output port, fine. The model starts in state passive. The time advance of infinity says that it will stay there forever unless an external event occurs. When it receives a borrow external event, it jumps immediately to state loadPeriod. This is shown by the external transition:

$\delta_{ext}$(passive, e, borrow)=loanPeriod

The model remains in loanPeriod for 30 days as shown by the time advance function:

ta(loadperiod)=30

If the book is returned before the end of this period, the model returns to state passive:

$\delta_{ext}$(loanPeriod, e, return)=passive (external transition function)

If the book is not returned in time (while in state loanPerido) it goes to a state overDue:

$\delta_{int}$(loanPeriod)=overDue (internal transition function)

When the book is finally returned, the model goes to a state fine:

$\delta_{ext}$(overDue, e, return)=fine*e (external transition)

Here we show that the model can store the value of elapsed time and use it compute fine.

There is an output from the state fine on the output port fine.

$\lambda$(fine)=fine*e (output function)

and the model transitions back to passive:

$\delta_{int}$(fine)=passive (internal transition function)

The concept of activity can be used to estimate the energy consumption of a system. The activity is a real number representing the amount of change a signal has undergone. As the signal increases, the activity increases, and as the signal decreases, the activity still increases. In a non-increasing or non-decreasing section, the activity is the change between the starting point and the ending point. Any section that is non-increasing or non-decreasing is separated by a local minimum or maximum, so the activity of the entire system can be measured as the sum of the activity between each adjacent minimum and maximum.

Figure 2:
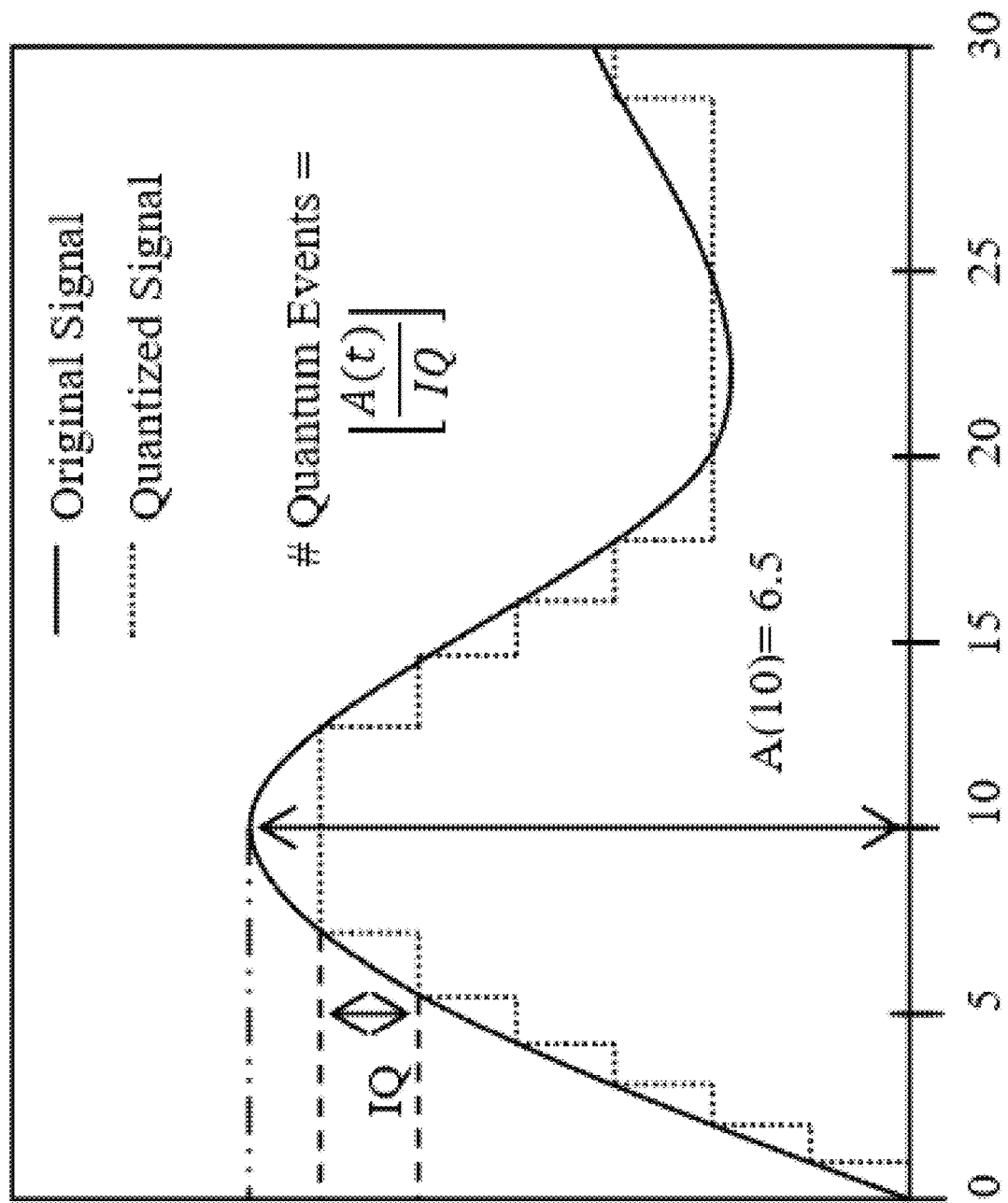
FIG. 2 illustrates an activity of a signal based on information quanta.

Implementations of a system can be set up to respond only to a certain threshold of change to its inputs. This is known as an information quantum, which is the minimum amount of change in a signal that is considered important. An information quantum defines the rate of change in temporal and spatial dimensions of raw data inputs, below which no processing is required and no change in system activity will be made. For example, an information quantum of 5 degrees for temperature inputs would dictate that no change in system activity will be occur if the difference between the previous recorded temperature and current temperature reading is less than 5 degrees. Each time that amount of change is seen in the signal in either direction that is equal to or greater than the information quantum, an event is generated. Therefore, the number of events generated is the activity of the signal divided by the information quanta. An example of the activity of a signal based on information quanta is shown in FIG. 2. As depicted, in 10 seconds, the signal changes a total of 6.5 units in a non-decreasing segment resulting in 6 events being generated.

Figure 3:
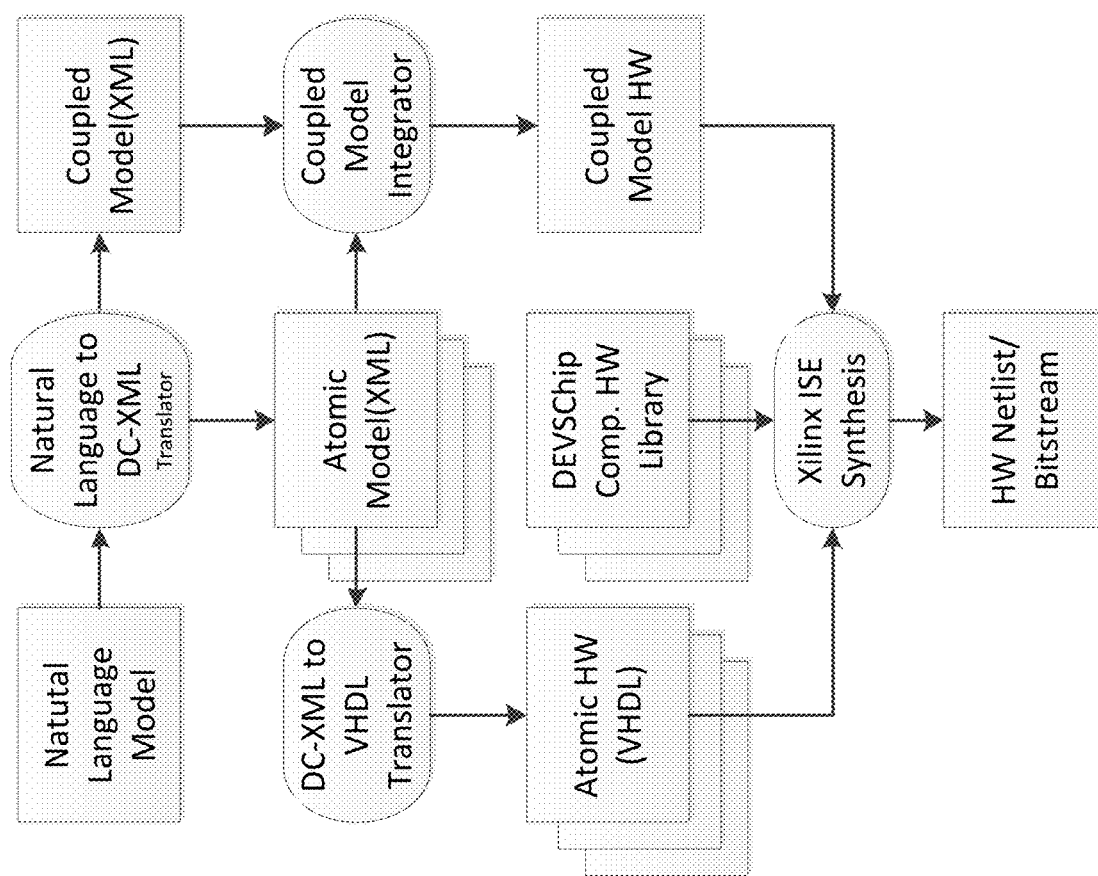
FIG. 3 illustrates a design flow for a method of translating implementations of an DEVS models into VHDL.

FIG. 3 provides an example of a design flow for a method of translating implementations of the DEVS models into VHDL (VHSIC (Very High Speed Integrated Circuits) Hardware Description Language). In some implementations, the model may be designed using a natural language description. A tool may be used to take the natural language representation and create DEVS models for each atomic model and a coupled model represented in DEVS Chip XML (DC-XML). A tool then translates the atomic models represented in XML into hardware atomic models described in VHDL. Another tool generates a hardware coupling represented as a VHDL top file, which connects all of the atomic hardware, using the coupled XML and Atomic XML. This tool may also evaluate the necessary timing for each model, assign a clock frequency, and recalculate time advance times in clock cycles for that frequency. The bit stream used to program an FPGA is then synthesized using for example, Xilinx ISE, from the generated VHDL files and the DEVSChip VHDL library.

Atomic Model Translation

Figure 4:
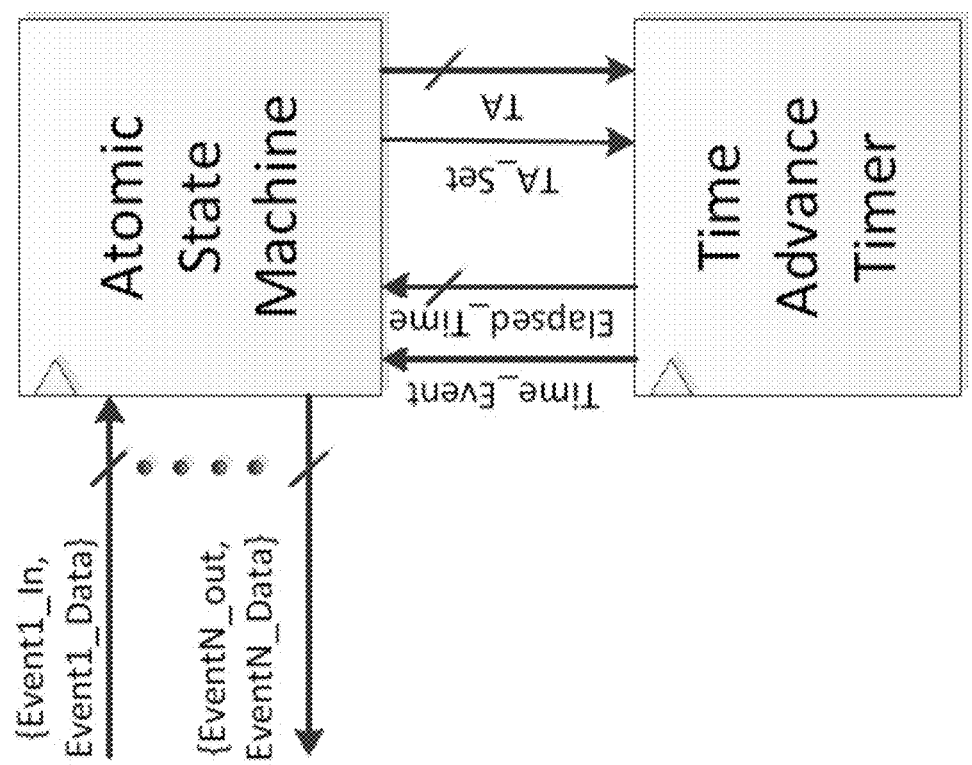
FIG. 4 illustrates a behavior of the model and a top file which connects a library components, such as a time advance, to an Atomic State Machine.

The next sections describe how each component of the DEVS model may be represented in XML, and how that XML is translated into hardware represented by VHDL code according to various implementations of the system and methods disclosed herein. The translation from the atomic XML to Hardware creates two files: the Atomic State Machine as seen in FIG. 4, which represents all of the behavior of the model and a top file which connects the library components, such as the time advance, to the Atomic State Machine.

Ports and Events

As one of ordinary skill, in the art will recognize, in DEVS, an event takes zero time, but takes place at a specific moment in time. This means that before the event there is no value on the port and during the instant of the event, there is a value present which is no longer present immediately after the event has occurred. In hardware design, the closest idea to this instantaneous transfer is a clock cycle. Knowing this, an integer event is divided into an event port and an integer port for representation in VHDL. To send an event, the event line is held high for a single clock cycle. DEVSChip logic is then written such that it reads the value from the integer port when the event signal is high.

An example of a port declaration in DC XML is shown in FIG. 5A and the closest parallel in VHDL is depicted in FIG. 5B. Each type of port (in and out) is separate and is comprised of a list of ports. The ports themselves are represented using the name and the type of the port. Only the out-ports are shown here as an example as the in-ports follow the same structure. The type of the port may be an integer or event port.

As shown FIG. 5A and 5B, for each port, even and odd, a pair of ports is generated: one that is 32 bit that may be used to send the values and the other that is a single bit that represents the event itself. For the Start port only the event port is generated as it is declared as an event, and not an integer. An example of the connections for the time advance timer is also depicted FIG. 4, FIG. 5A, and 5B.

States and State Variables

FIGS. 6A-B depict an example of a representation of the states and state variables in DC-XML and VHDL, respectively. As shown, a list of states is declared, with each state containing its name and with one state listed as the initial state. The conversion to hardware consists of enumerating the states and using them as the names of cases in the state machine. The state machine is set to the initial state when the reset is high. In another embodiment, in DC-XML, a state variable is comprised of its name and a default value. In hardware, the state variables are instantiated using the variable declaration and the default value is assigned on reset.

External Transitions

FIGS. 7A-B provide an example of an external transition, $\delta_{ext}$, in DC-XML and VHDL, respectively. Each external transition contains an incoming message and a transition. A transition is the same for both internal and external transitions and comprises some number of expressions to evaluate, a starting state, one or more conditionals, and a default state. The conditionals contain a condition and a state.

In hardware, the transition is evaluated when the event signal for the port described in the incoming message is high, and executes. The evaluate statements are converted into VHDL as shown in FIG. 7B and executed. The conditionals are then computed as a series of if else statements, the final else being the default. In each of these if else statements the next state is assigned as well as the time advance value for that state. No conditionals are used in the example of FIGS. 8A-8B, but in another embodiment, one or more conditionals may be used. Transitions must have a default state, which means that there would then also be a series of conditions, if one is true it is taken, if none are true the default is used. The designer must ensure that only one condition is true at a time.

Internal Transitions

FIGS. 8A-B provide an example of an internal transition, $\delta_{int}$, in DC-XML and VHDL, respectively. Internal transitions contain a transition that is used in the same manner as that of an external transition.

In the hardware description, when a time advance generates an event, the internal transition is evaluated. While this is accomplished in generally the same manner for internal and external transitions, there is a difference in how they occur. As shown in FIGS. 9A-B, the time advance is assigned from a variable which adds another set of "if" and "else" statements that determine whether the process should run as a delta cycle or as a timed phase.

Output Functions

FIG. 8A also shows an example of the DC-XML declaration for the output function, λ.

The lambda set is a list of the output functions, λ. Each lambda contains a state, some evaluate expressions, and some number of output ports. For each state there is one lambda, but each lambda can have each output port represented. The output ports contain some number of conditional statements and a default. The conditional statements contain a condition and a state variable name.

The hardware description for the output function comes after the internal transition, when the time advance timer has triggered. The evaluate statements are entered and a series of "if else" are generated from the conditional statements ending with the default value. If the default value is not present, no event will be generated. This differs from the conditions used in transitions in which neither output uses a default so in the "if" statements, the value is assigned and the event signal is set high and in the "else" statements, the event signal is set low thereby indicating no event.

Time Advance Translation

In DC-XML, the time advance is a list of time advances for each state. These may contain the state name and the timeout. The timeout can be either a value or a variable. In hardware, the reset uses the timeout of the initial state to set the time advance for the first time. The individual timeouts are output to the time advance timer at the entry to the state as shown in FIGS. 9A-B. The time advance can be set to a variable, and in this case the time advance will be set only if the value is non-zero, otherwise a flag for a delta cycle will be set such that the next state is immediately transitioned to.

The time advance function requires special consideration in the translation from DEVS to VHDL. VHDL is a good tool to use for representing state machines which have an implied clock cycle, but DEVS is a more robust Process Framework that can have transitions occurring at any time. Thus, to represent the DEVS transitions in VHDL a representation of time must be generated, for example, by adding in the time advance timer. This is a separate functional component in VHDL that interacts with the main logic of the atomic model. An example of the ports of the time advance timer can be seen in FIGS. 5A-B. There are two inputs to the time advance timer: an integer value of the time advance representing the time that the atomic model needs to wait and a time advance set signal which tells the timer to read from the time advance value. Returned to the atomic model are the elapsed time, which is the current value of the timer, and a time event, the signal which signifies that the elapsed time has reached the time advance value.

Coupled Model

The translation of coupled models creates a VHDL file that instantiates all of the atomic components, then interconnects their ports. Implementations of this tool may also be used to evaluate the timing that is specified for the atomic models in seconds, and assign them an appropriate clock frequency that allows the model to complete its computations in a timely manner as well as being as power efficient as possible. The tool may then recalculate all time advance values in terms of clock cycles given the new frequency instead of in seconds.

Power Optimization for Atomic Models

In a digital circuit, power consumption can be divided into two components: static power and the dynamic power. The static power is the power consumed by the components and comes from the device's leakage currents. This is the minimum power that a digital circuit will ever use. The dynamic power represents the power consumption of the logic as it performs computations and is a result of the transistors turning on and off. Each time a transistor turns on or off, a small current is generated to charge or discharge a capacitor. When a set of synchronous logic receives a change in the clock signal, some transistors turn on or off regardless of whether the digital logic signals change. Because of this, one can reduce the dynamic power consumption of synchronous logic without altering the circuit by reducing the number of clock edges the circuit sees.

Based on the nature of dynamic power consumption, two systems for automatically reducing the dynamic power may be used. The first system runs the different atomic models at different clock frequencies which may reduce the overall number of clock cycles seen by the circuit when it is running, thereby reducing the dynamic power consumption of active circuits. The clock frequency is determined based on an as fast as necessary approach. Depending on the specification of seconds, a clock frequency and corresponding number of clock cycles are used to achieve that timing, but the clock frequency is set only fast enough to maintain the necessary behavior. To allow for these separate clock domains, event handshaking may be used to ensure transmission.

The second system utilized a method of clock gating. Clock gating is using an AND gate to prevent the clock signal from reaching the circuitry. This provides a dynamic power savings in a similar way as above by reducing the number of clock pulses seen by the circuitry, however, in this instance, the power is reduced when the circuit is inactive. This is achieved with a clock gating component and modifying the atomic state machine such that it turns its own clock off when it is not in use.

Handshaking

Figure 10:
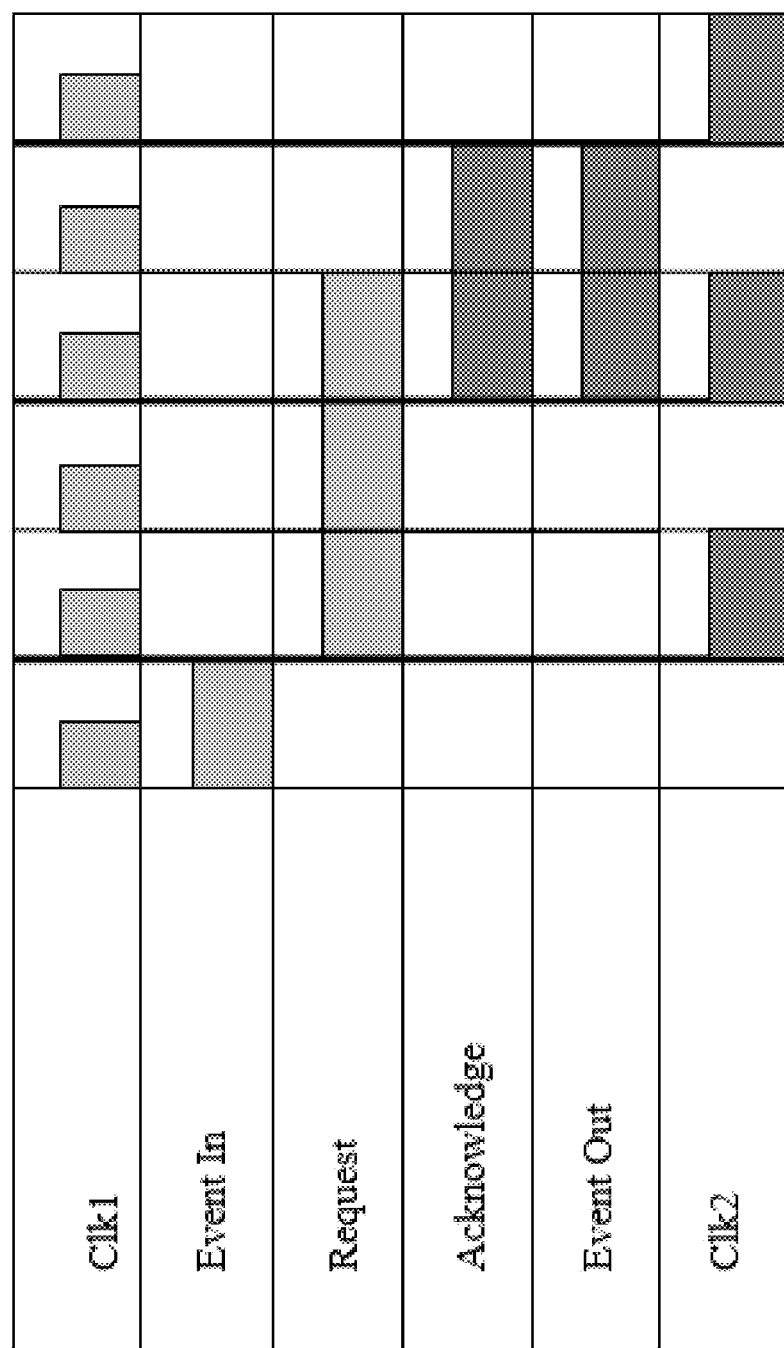
FIG. 10 illustrates an example of how the handshaking works.
Figure 11:
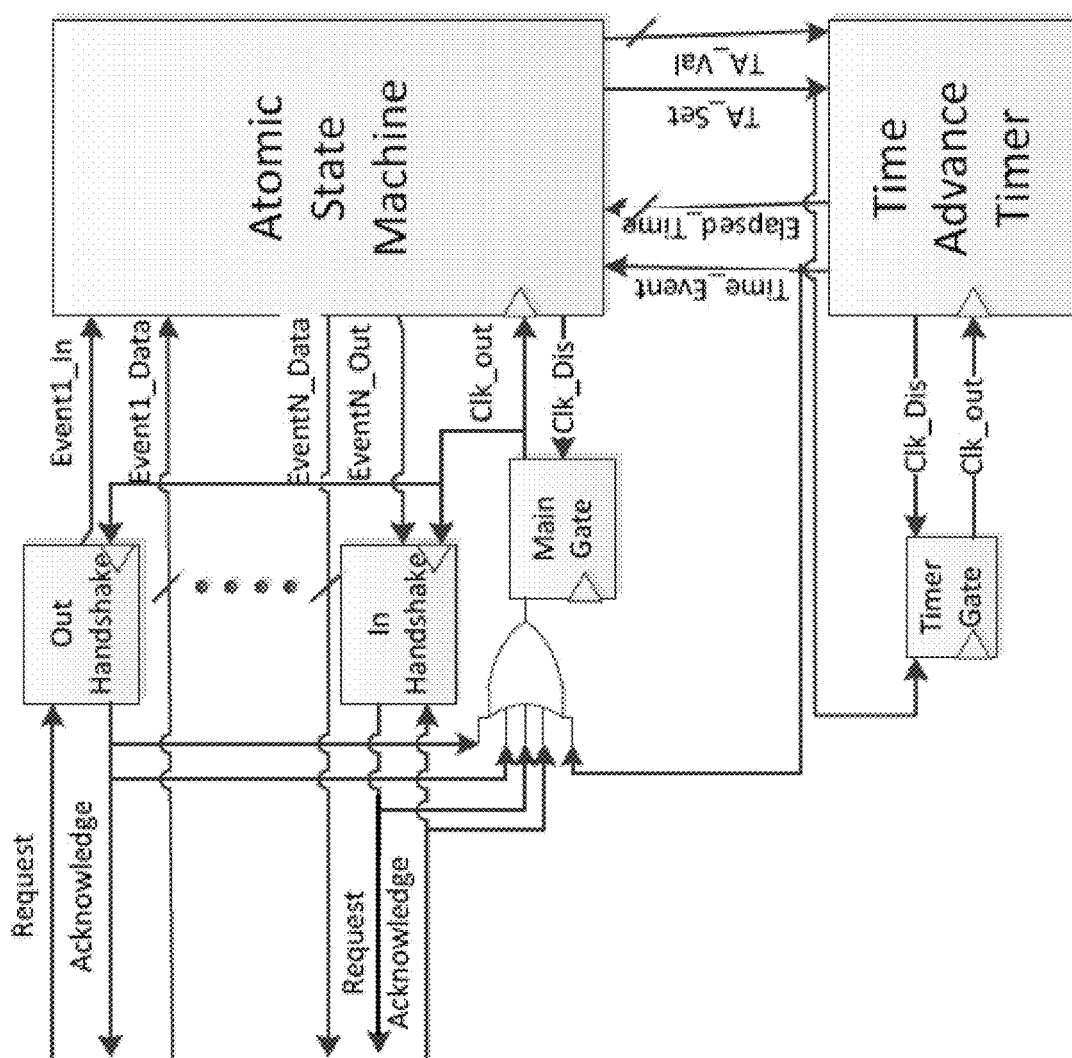
FIG. 11 illustrates a clock gating implemented into a main atomic logic and a time advance timer.

Handshaking may be implemented using two components that are inserted between two atomic models, one of which takes in an event and generates handshaking signals referred to as the input. The other takes in the handshaking signals and outputs the event. The handshaking signals are the Request and the Acknowledge. An example of how the handshaking works is shown in FIG. 10. The incoming event and the request line originate in the first clock domain and the outgoing event and the Acknowledge originate in the second clock domain. The incoming event tells the input handshaking unit to assert the request signal, taking one cycle. Once the request signal is asserted, the output unit responds on the next positive clock edge of the second clock by asserting the Acknowledge. This is also the time that the outgoing event is generated. Once the input handshaking unit sees that the Acknowledge is high, it de-asserts the request line. Once the output handshaking unit sees the request line is low it de-asserts the Acknowledge. When the input signal sees the de-assertion of the Acknowledge, it returns to a ready state. In a standard full handshaking design the de-assertion of the Acknowledge is where the event is generated. This is the time at which the two clock domains are synchronized to within one clock cycle of the first domain. In implementations of the system disclosed herein, the event is sent with the beginning of the Acknowledge. This is done to reduce latency and it has no negative effects because there is no feedback to the main logic function so the main logic sending the event is not synchronized in either case. The full handshaking helps to ensure that the handshaking units remain synchronized.

Clock Gating

The clock gating may be implemented such that the main atomic logic and the time advance timer can be gated separately, using separate instances of the same component. The component has inputs for a clock enable, clock disable, and the clock. It then outputs the gated clock signal. When the enable signal is asserted, the clock is immediately enabled, but when the clock disable signal is asserted, it takes a clock cycle to be disabled. If both are asserted, the clock stays on ensuring functionally is maintained over power savings.

The clock disable signals are generated by the atomic state machine and the time advance timer. In the atomic state machine, whenever a non-zero time advance is entered, the clock disable signal will be asserted. The timer sets its clock disable whenever an infinite time advance is set, or after it has generated a time event. The enable signal for the timer is the time advance set. The enable signal for the main logic is generated by entering all Request and Acknowledge signals in the model with the time event signal into an OR gate, meaning that if any event, or if the time event occurs, the logic is awakened. This can be seen in FIG. 11.

The clock gating does not affect the timing of the model beyond additional setup and hold time. The clock enable can be triggered asynchronously, which means that at the assertion of a request signal, the next clock cycle will be registered by the logic instead of a one cycle penalty that synchronous logic would incur. For this reason, the handshaking units are driven by the same gated clock as the main logic, ensuring that no events are generated without the main logic being awakened.

Experimental Results

Figure 12B:
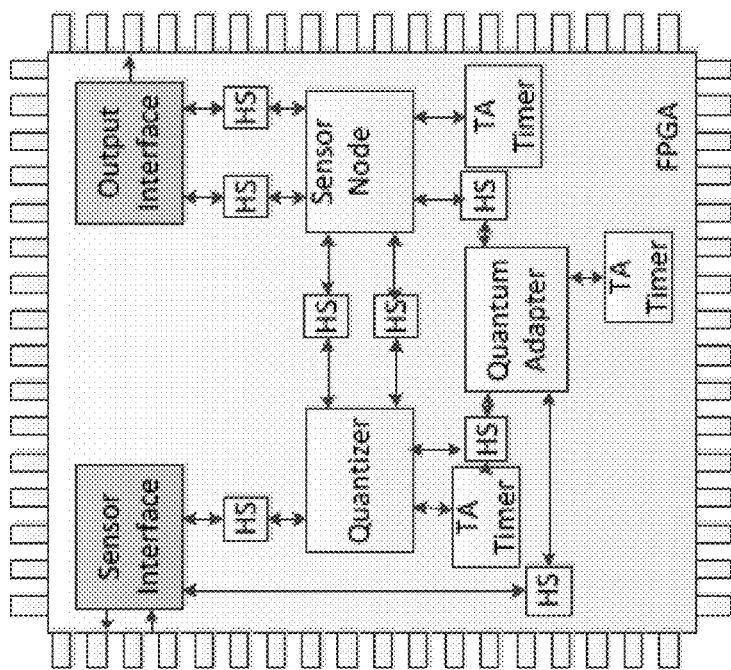
FIG. 12B illustrates of the hardware that is automatically generated from the XML files is provided which shows an example of the three DEVS models, in addition to the handshaking units and timers.
Figure 12A:
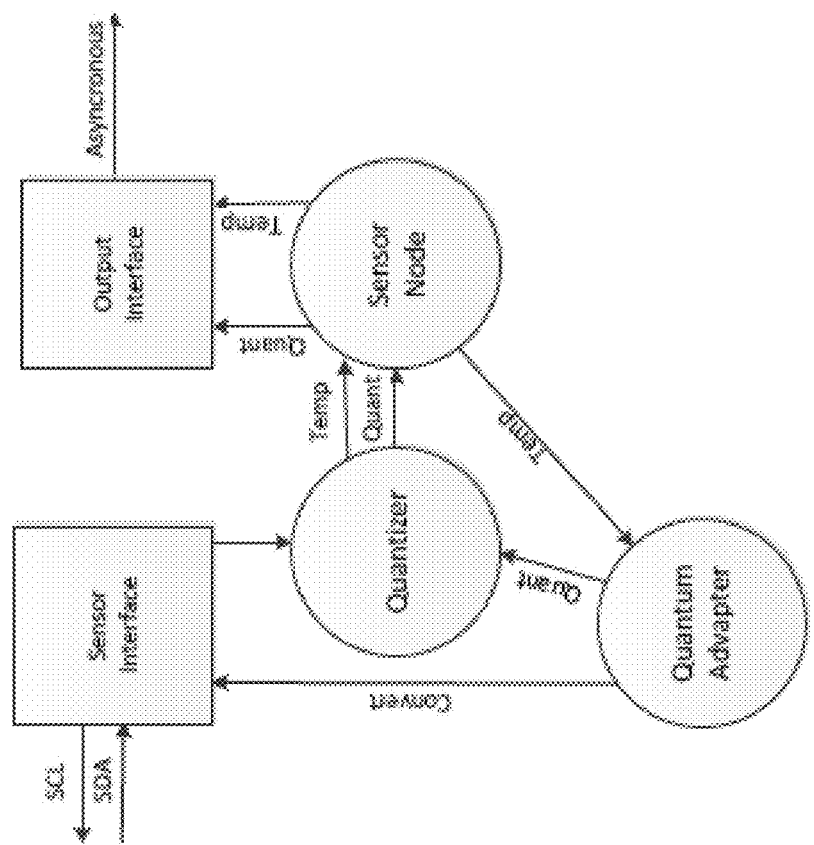
FIG. 12A illustrates an implementation of 3 pure DEVS models and 2 models.

An illustrative example of an implementation of the system disclosed herein is shown in FIG. 12A-B. This implementation comprises 3 pure DEVS models and 2 modified models and illustrates a manner in which the DEVS models may interface with the outside world. The three DEVS models, as shown in FIG. 12A, are the quantum adapter, the sensor node, and the quantizer. The other two models, the output interface and the sensor interface, accept and generate DEVS events, but also generate signals on the FPGA pins. In FIG. 12B, an illustration of the hardware that is automatically generated from the XML files is provided which shows an example of the three DEVS models, in addition to the handshaking units and timers.

In the context of the DEVS fire example discussed above, the purpose for implementing this system is to record temperatures and report them wirelessly to a central data collector. In this example, the wireless communication is called upon to send only meaningful data and therefore saves energy and bandwidth (Note that further efficiencies may be gained in a DEVS-based design of the wireless transmitter itself). An implementation of a method of information quanta is used to collect the temperature activity. The sensor node communicates with an off chip temperature sensor using, for example, I2C protocols. This data is evaluated by the quantizer which has a stored quantum size and a stored temperature value. If the difference between the stored temperature and the new temperature value is greater or equal to the quantum size, the new temperature is saved, and the quantizer generates an event that transmits the temperature and quantum value to the Sensor Node. This is the quantization of the temperature signal; small changes will not affect the system beyond the quantizer, and are not broadcast.

In this example, the sensor node receives the temperature value and quantum size, relays them both to the output interface, and relays the temperature to the quantum adapter. The quantum adapter takes in the temperature and depending on which temperature range it falls into, sends a new quantum to the quantizer, and changes the frequency with which conversions are initiated. This is how the DEVS model changes its behavior based on the system activity. When the temperature is low, the quantum adapter has a large quantum size as the changes are likely unimportant. When the temperature is higher, the quantum adapter specifies a smaller quantum size and sample more frequently to better describe a fire. The quantum adapter is able to change the conversion frequency because it generates the conversion event which triggers the sensor interface to read the temperature. This is accomplished by the quantum adapter outputting the conversion event when it exits its wait state. The timeout for this state is set to generate the frequency required for a given temperature range when the temperature is received.

The output interface receives the temperature and quantum value from the sensor node and sends them using asynchronous communication to a computer terminal.

Figure 13:
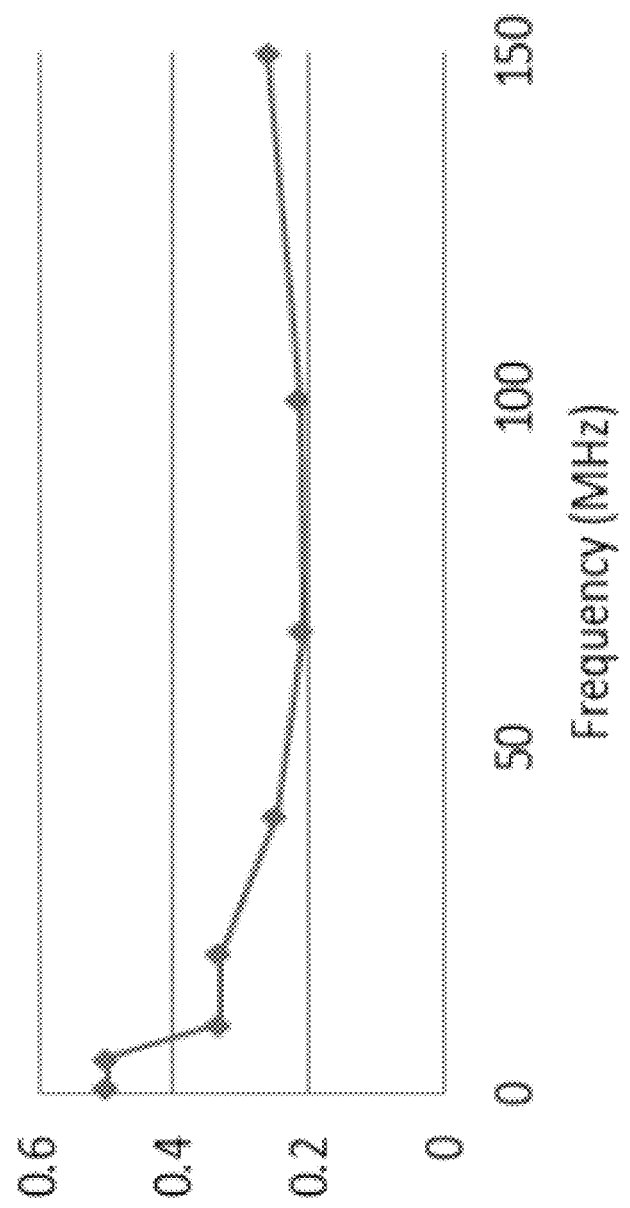
FIG. 13 shows the ratio of the dynamic power consumption of the gated to the un-gated circuit.
Figure 14:
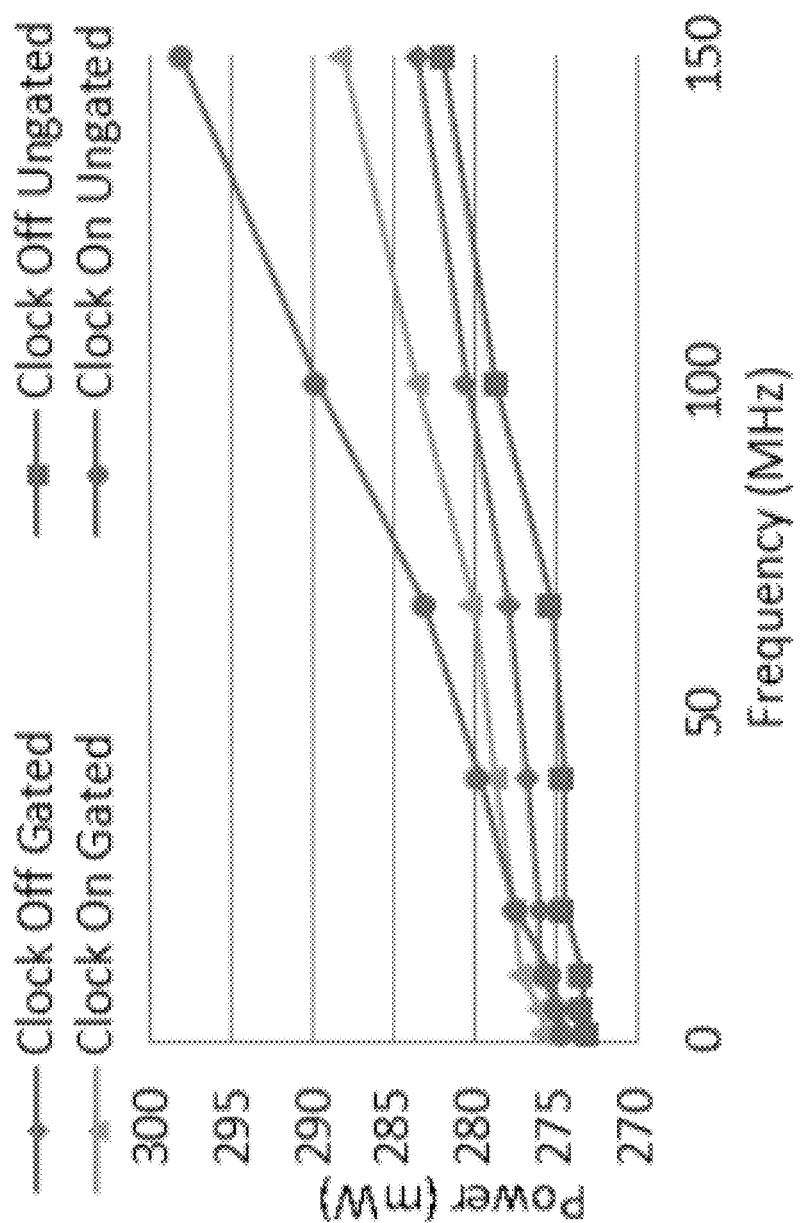
FIG. 14 shows the raw measurements used to determine the dynamic power consumption.
Figure 15:
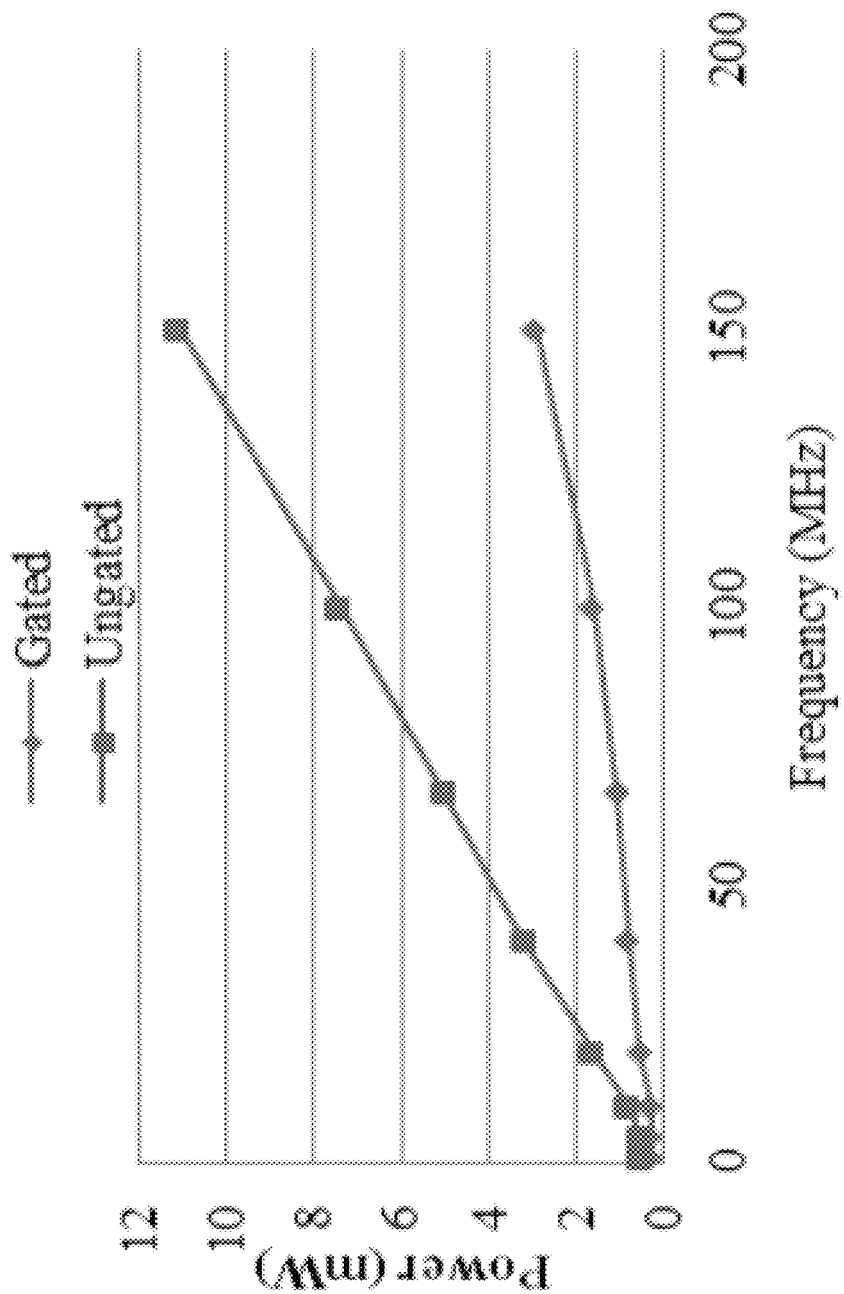
FIG. 15 shows the power consumption by frequency for gated and un-gated circuits.

The actual data collected and shown in FIGS. 13-15 for this fire example based on an implementation using the components described as follows, however, one of ordinary skill in the art would recognize that such implementations are not limited to these specific components and any suitable components may alternatively be used. This model was synthesized onto an Avnet Spartan 6 board using Xilinx ISE 11.5. This board was used as the Spartan 6 is a power efficient chip, and the board itself does not have many peripherals that may skew the power measurements. The measurements were taking with all of the clock domains receiving the same clock frequency to simplify the calculations. The clock frequencies were varied with the use of the dynamic clock management units in the Spartan 6 board, these components have a large power draw compared to the logic, so to get the dynamic power consumption of the logic alone, the base power measurements were made with the clock unit running, but disconnected from the logic by use of a global clock enable. A total of four measurements were taken, varying the global clock on and off, and allowing the circuits to do individual clock gating, or forcing the clock to on. FIG. 14 shows the raw measurements used to determine the dynamic power consumption. FIG. 15 shows the power consumption by frequency for gated and un-gated circuits based of FIG. 14. FIG. 13 shows the ratio of the dynamic power consumption of the gated to the un-gated circuit from FIG. 15. This figure demonstrates that the gated circuit used less than 30 percent of the dynamic power of the un-gated version at frequencies above 20 Mhz.

The methods of the present invention described above may be implemented as one or more software processes executable by one or more processors and/or one or more firmware applications. The processes and/or firmware are configured to operate on one or more general purpose microprocessors or controllers, a field programmable gate array (FPGA), an application specific integrated circuit (ASIC), or other hardware capable of performing the actions describe above. In an exemplary embodiment of the present invention, software processes are executed by a CPU in order to perform the actions of the present invention. Additionally, the present invention is not described with reference to any particular programming language. It will be appreciated that a variety of programming languages may be used to implement the teachings of the invention as described herein.

In places where the description above refers to particular implementations of computerized systems and methods for an activity-based design Process Framework for a DEVS chip, it should be readily apparent that a number of modifications may be made without departing from the spirit thereof and that these implementations may be applied to other embodiments of DEVS chip activity-based design Process Framework systems and methods.

Figure 16:
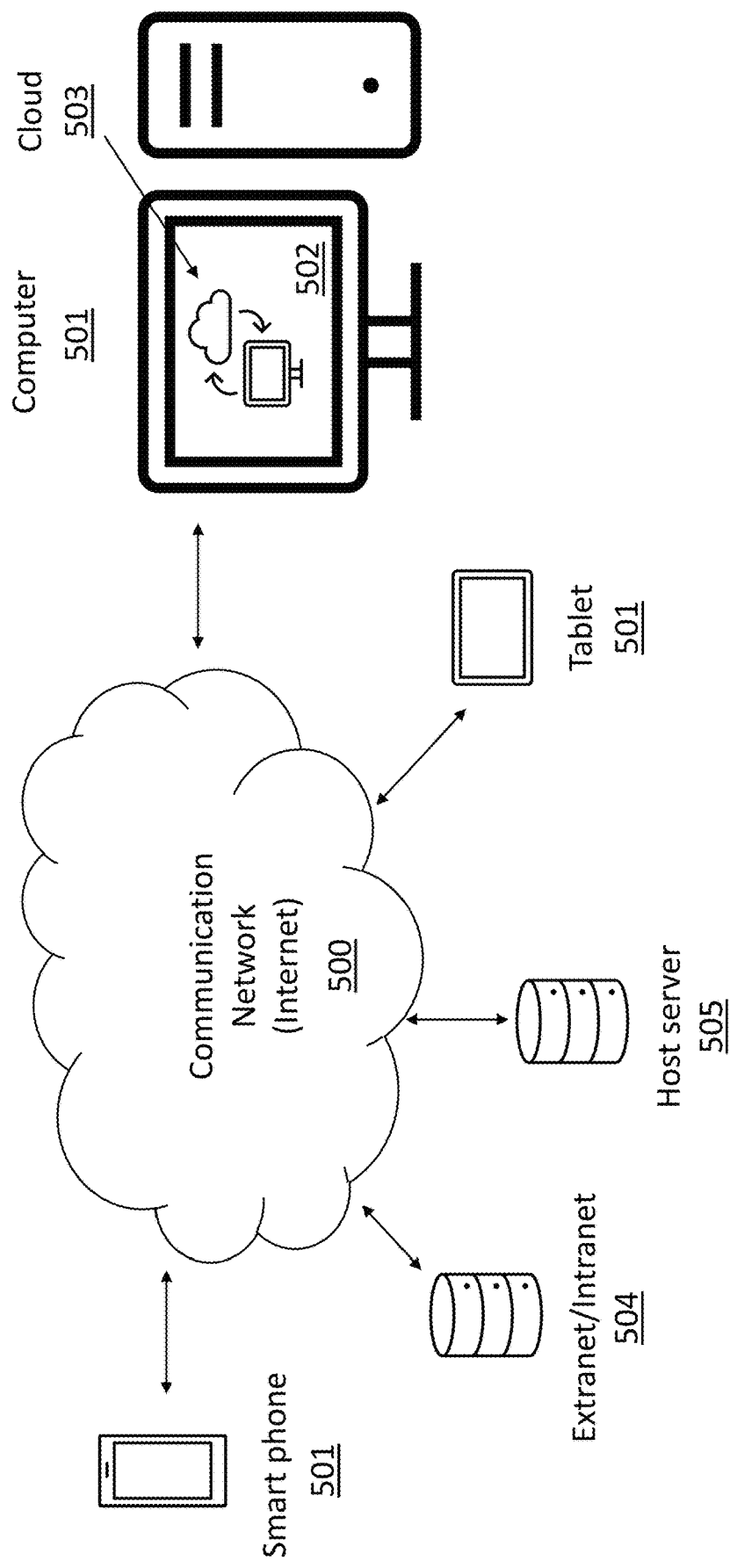
FIG. 16 illustrates a computer wirelessly downloaded a program product including a machine-readable program code for a DEVS chips.

FIG. 16, the system of the present invention may include at least one computer 501 with a user interface. The computer may include any computer including, but not limited to, a desktop, laptop, and smart device, such as, a tablet and smart phone. The computer 501 includes a computer software program product including a machine-readable program code for causing, when executed, the computer to perform steps. The program product may include software which may either be loaded onto the computer or accessed by the computer. The loaded software may include an application on a smart device. The software may be accessed by the computer using a web browser 502. The computer may access the software via the web browser using the internet 500, extranet, intranet 504, host server 505, internet cloud 503 and the like.

The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

Where this application has listed the steps of a method or procedure in a specific order, it may be possible, or even expedient in certain circumstances, to change the order in which some steps are performed, and it is intended that the particular steps of the method or procedure claim set forth herein below not be construed as being order-specific unless such order specificity is expressly stated in the claim.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims. It should be understood, of course, that the foregoing relates to exemplary embodiments of the invention and that modifications may be made without departing from the spirit and scope of the invention as set forth in the following claims.

What is claimed is:

1. A method for a power optimization system for atomic models in Discrete Event System Specification (DEVS) model comprising:
   tracking a history of a system with DEVS model;
   consuming power in the power optimization system,
   wherein each different atomic DEVS model is communicated using a hardware description language, and
   wherein the power consumption comprises: a static power system and a dynamic power system;
   reducing the dynamic power system using clock signals,
   wherein using the clock signals is one of running different atomic DEVS models at different clock frequencies or utilizing a method of clock gating,
   wherein a handshaking is used for running different atomic DEVS models at different clock frequencies and the handshaking is implemented using two components that are inserted between two atomic DEVS models, and
   wherein the different DEVS atomic models generate handshaking signals for synchronization.

2. The method of claim 1, wherein the clock frequency is set only fast enough to maintain the necessary behaviors in the dynamic power system.

3. The method of claim 1, wherein the clock gating uses an AND gate with a clock on/off signal to prevent the clock signals from reaching a circuitry in the dynamic power system.

4. The method of claim 1, wherein the method of clock gating is implemented into the dynamic power system connecting to an atomic state machine and a timer advance timer.

5. The method of claim 4, where clock disable signals are generated by the atomic state machine and the timer advance timer.

6. The method of claim 5, wherein, in the atomic state machine, when a non-zero time advance is entered into the systems, the clock disable signal is asserted.

7. The method of claim 1, wherein the clock frequencies are varied with a use of the dynamic power system.

8. A power optimization system for atomic models in Discrete Event System Specification (DEVS) model comprising:
   a processor tracking a history of the system with DEVS model,
   wherein each different atomic DEVS model is communicated using a hardware description language;
   a static power system consuming power with physical components; and
   a dynamic power system consuming power with performing computations,
   wherein the processor reduces the dynamic power system using clock signals,
   wherein using the clock signals is one of running different atomic DEVS models at different clock frequencies or utilizing a method of clock gating,
   wherein a handshaking is used for running different atomic DEVS models at different clock frequencies, and wherein the handshaking is implemented using two components that are inserted between two atomic DEVS models, and
   wherein the atomic DEVS models generate handshaking signals for synchronization.

9. The power optimization system of claim 8, wherein the clock frequency is set only fast enough to maintain the necessary behaviors in the dynamic power system.

10. The power optimization system of claim 8, wherein the clock gating uses an AND gate with a clock on/off signal to prevent the clock signals from reaching a circuitry in the dynamic power system.

11. The power optimization system of claim 8, wherein the method of clock gating is implemented into the dynamic power system connecting to an atomic state machine and a timer advance timer.

12. The power optimization system of claim 11, where a clock disable signals are generated by the atomic state machine and the timer advance timer.

13. The power optimization system of claim 12, wherein, in the atomic state machine, when a non-zero time advance is entered into the systems, the clock disable signal is asserted.

14. The power optimization system of claim 8, wherein the clock frequencies are varied with a use of the dynamic power system.

* * * * *